US 8,553,594 B2

(12) United States Patent
Baum et al.

(10) Patent No.: US 8,553,594 B2
(45) Date of Patent: Oct. 8, 2013

(54) METHOD AND APPARATUS FOR RESOURCE ALLOCATION WITHIN A MULTI-CARRIER COMMUNICATION SYSTEM (75) Inventors: Kevin L. Baum, Rolling Meadows, IL (US); Brian K. Classon, Palatine, IL (US); Arvind Krishnamoorthy, Arlington Heights, IL (US); Vijay Nangia, Algonquin, IL (US); Philippe J. Sartori, Algonquin, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1479 days.

(21) Appl. No.: 11/688,486

(22) Filed: Mar. 20, 2007

(65) Prior Publication Data
US 2008/0232240 A1 Sep. 25, 2008

(51) Int. Cl.
H04B 7/00 (2006.01)
H04B 7/212 (2006.01)
H04W 4/00 (2009.01)
H04W 88/00 (2009.01)

(52) U.S. Cl.
CPC ................................ *H04W 88/00* (2013.01)
USPC ........................... 370/310; 370/322; 370/329

(58) Field of Classification Search
USPC .................. 370/210, 310, 322, 329
See application file for complete search history.

(56) References Cited

U.S. PATENT DOCUMENTS 5,422,913 A * 6/1995 Wilkinson .................... 375/347
7,688,708 B2 * 3/2010 Li et al. ......................... 370/203
2002/0164954 A1 * 11/2002 Jalali ............................. 455/67.1
2003/0026293 A1 * 2/2003 Raissinia et al. .............. 370/474
2003/0035393 A1 * 2/2003 Sinnarajah et al. ........... 370/335
2003/0060208 A1 * 3/2003 Achour et al. ................ 455/450
2003/0148732 A1 * 8/2003 Hunter et al. ................... 455/10
2004/0082356 A1 * 4/2004 Walton et al. ................. 455/522
2005/0048985 A1 * 3/2005 Haartsen ....................... 455/453
2005/0207385 A1 * 9/2005 Gorokhov et al. ............ 370/344
2005/0232135 A1 10/2005 Mukai et al.
2005/0286408 A1 12/2005 Jin et al.
2006/0009168 A1 * 1/2006 Khan et al. .................... 455/101
2006/0205414 A1 * 9/2006 Teague ........................ 455/452.1

(Continued)

FOREIGN PATENT DOCUMENTS

EP          1 750 407 B1    2/2007
WO     WO 2007-015529 A1   2/2007

OTHER PUBLICATIONS

Mitsubishi Electric, "Scheduling Policy and Signaling Way on DL Resource Allocation," 3GPP TSG RAN WG1 #49, Kobe, Japan, May 7-11, 2007, Tdoc R1-072060.

(Continued)

Primary Examiner — Jason Mattis
Assistant Examiner — Stephen J Clawson (57) ABSTRACT A method and apparatus for performing resource allocation with lower required overhead is provided herein. Resource allocations for data transmissions are chosen in such a way as to provide channel quality information for various parts of the channel bandwidth (frequency selective channel quality information), such as allocating two different resource blocks (on different sets of subcarriers) to a mobile unit for two different transmissions. These data transmissions are used to estimate frequency selective channel quality information, thereby eliminating or greatly reducing the need for channel sounding with a broadband pilot. As a result, the overhead on the uplink of the communication system may be significantly reduced.

20 Claims, 8 Drawing Sheets

(56) References Cited

U.S. PATENT DOCUMENTS

| | | |
|---|---|---|
| 2006/0209754 A1* | 9/2006 | Ji et al. .................... 370/329 |
| 2007/0004465 A1* | 1/2007 | Papasakellariou et al. ... 455/571 |
| 2008/0101319 A1* | 5/2008 | Rao ........................ 370/342 |
| 2009/0209261 A1 | 8/2009 | Kuri et al. |

OTHER PUBLICATIONS

Yun Bae Kim, "PCT/US2008/055985—PCT International Search Report and Written Opinion," WIPO, ISA/KR, Korean Intellectual Property Office, Daejeon, Republic of Korea, Jul. 30, 2008.

* cited by examiner

METHOD AND APPARATUS FOR RESOURCE ALLOCATION WITHIN A MULTI-CARRIER COMMUNICATION SYSTEM

FIELD OF THE ABOVE TECHNIQUE

The present invention relates generally to communication channel resource allocation and in particular to a method and apparatus for performing frequency semi-selective resource allocation.

BACKGROUND OF THE ABOVE TECHNIQUE

It is well known that orthogonal frequency division multiplexed (OFDM) systems divide a channel bandwidth into several narrowband subcarriers. Many modern OFDM system proposals include the capability to support frequency-selective (FS) resource allocation. During frequency-selective resource allocation, the channel bandwidth is divided into several sub-bands, which may be called tiles or resource blocks. Each resource block is used for a particular transmission over a particular time interval, and includes several adjacent OFDM subcarriers and spans multiple OFDM symbol periods. For example, a resource block in an OFDM system with a 15 kHz subcarrier spacing and a 4.76 us cyclic prefix length could be defined as containing 12 adjacent subcarriers (~180 kHz), and the minimum time that a resource block can be assigned for could be seven OFDM symbol periods (~0.5 msec).

A Discrete Fourier Transform (DFT) pre-coder can be applied to data prior to mapping the data onto the OFDM subcarriers. Such a modulation scheme is known as DFT-spread OFDM, or DFT-SOFDM. DFT-SOFDM can use resource blocks for transmission, similar to plain OFDM.

The use of resource blocks in OFDM or DFT-SOFDM enables data allocation to a particular user or mobile unit to be made on the resource block having the best channel quality. However, this requires the base station to determine which resource block has the best quality for the mobile unit, on either the downlink or uplink depending on whether the resource allocation is for receiving data or transmitting data. For frequency selective resource allocation on the downlink, a mobile unit can determine the downlink channel quality of various resource blocks by monitoring a wideband pilot channel on the downlink, which can be received and similarly used by all mobile units. However, for frequency selective resource allocation for the uplink, the base station will not be able to determine the necessary uplink channel quality information for a particular mobile unit unless the mobile unit transmits a wideband channel sounding pilot signal. The sounding pilot signal results in additional uplink overhead, and this overhead can become large when the number of active mobile units in a cell wanting to perform wideband channel sounding becomes large. Therefore, a need exists for a method and apparatus for performing resource allocation with lower required overhead than previous wideband channel sounding-based methods.

DETAILED DESCRIPTION OF THE DRAWINGS

In order to address the above-mentioned need, a method and apparatus for performing resource allocation with lower required overhead is provided herein. More particularly, a hybrid approach to obtaining channel quality information and to resource allocation is provided and referred to as frequency semi-selective (FSS) resource allocation, or FSS-RA. FSS-RA obtains some of the advantages of frequency selective (FS) allocation, such as high performance due to transmission on a part of the channel bandwidth having higher quality, and some of the advantages of frequency non-selective (FNS) allocation, such as low overhead and robustness to channel variations due to Doppler. The proposed FSS-RA scheme does not require channel sounding overhead. However, channel sounding may be used advantageously with the invention for some conditions, such as at the start of a series of transmissions by a mobile unit, in order to provide initial channel quality information.

For FSS-RA, resource allocations for data transmissions are chosen in such a way as to provide channel quality information for various parts of the channel bandwidth (frequency selective channel quality information), such as allocating two different resource blocks (on different sets of subcarriers) to a mobile unit for two different transmissions. These data transmissions are used to estimate frequency selective channel quality information, thereby eliminating or greatly reducing the need for channel sounding with a broadband pilot. As a result, the overhead on the uplink of the communication system may be significantly reduced.

The present invention encompasses a method for assigning resources to a communication unit for transmission by the communication unit. The method comprises the steps of receiving a first transmission from the communication unit, where the first transmission comprises data, and where the first transmission occupies only a first portion of the communication channel bandwidth. A channel quality is estimated for a first set of candidate time-frequency resources based on the received first transmission, and a second transmission is received from the communication unit. The second transmission comprises data, and occupies only a second portion of the communication channel bandwidth. A channel quality is estimated for a second set of candidate time-frequency resources based on the received second transmission. The communication unit is assigned one of the first and the second set of candidate time-frequency resources having a higher estimated channel quality along an additional set of time-frequency resources to the communication unit for at least data transmission by the communication unit.

The present invention additionally encompasses a method for a communication unit to obtain a resource assignment. The method comprises the steps of performing a first transmission, where the first transmission comprises data, and where the first transmission occupies only a first portion of a communication channel bandwidth. A second transmission is then made, where the second transmission comprises data, and where the second transmission occupies only a second portion of the communication channel bandwidth. A message is then received assigning a first and a second set of time-frequency resources for subsequent transmission by the communication unit, where the first set of time-frequency resources occupies one of the first portion and the second portion of the communication channel bandwidth, and where the second set of time-frequency resources occupies a portion of the bandwidth other than the first and the second portion of the communication channel bandwidth. An assigned candidate set of time-frequency resources is determined based on the message.

The present invention additionally encompasses an apparatus comprising a receiver receiving a first transmission from a communication unit, where the first transmission comprises data, and where the first transmission occupies only a first portion of the communication channel bandwidth, the receiver additionally receives a second transmission from the communication unit, where the second transmission comprises data, and where the second transmission occupies only a second portion of the communication channel bandwidth. The apparatus additionally encompasses a channel quality estimator estimating a channel quality for a first set of candidate time-frequency resources based on the received first transmission and for estimating a channel quality for a second set of candidate time-frequency resources based on the received second transmission. Finally, the apparatus comprises a channel resource assigner assigning to the communication unit, one of the first and the second set of candidate time-frequency resources having a higher estimated channel quality and additionally assigning, to the communication unit, an additional set of time-frequency resources to the communication unit for at least data transmission by the communication unit.

Figure 1:
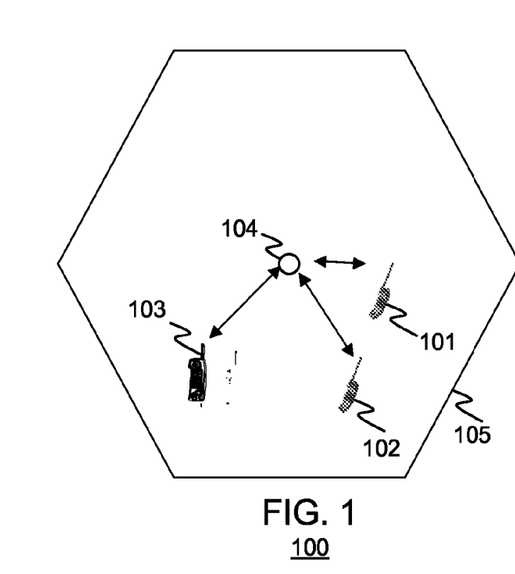
FIG. 1 is a block diagram of a communication system.

Turning now to the drawings, wherein like numerals designate like components, FIG. 1 is a block diagram of communication system 100. Communication system 100 comprises a one or more cells 105 (only one shown) each having a base transceiver station (BTS, or base station) 104 in communication with a plurality of remote, or mobile units 101-103. In the preferred embodiment of the present invention, communication system 100 utilizes an Orthogonal Frequency Division Multiplexed (OFDM) based or multicarrier based architecture. Multiple-antenna techniques, such as transmit diversity, MIMO, receive diversity etc. may be employed as well. As such, base station 104 may employ multiple antennas (not shown in FIG. 1) to weight and transmit one or more data streams across multiple OFDM subcarriers to one or more receiving devices 101-103, and to receive signals from mobile units 101-103. Base station 104 or mobile units 101-103 may also use spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques.

Remote units 101-103 may also be referred to as communication units, User Equipment (UE), subscriber stations (SS), mobile stations (MS), mobile units, mobiles, or simply users, while base station (BS) 104 may also be referred to as a communication unit, access point, or simply Node-B. Remote units 101-103 receive signals, such as data and uplink resource allocations from base station 104 and transmit signals to the base station 104. Base station 104 comprises transmitter(s) and receiver(s) that serve a number of remote units within a sector. As known in the art, the entire physical area served by the communication network may be divided into cells, and each cell may comprise one or more sectors. Common cell configurations are single sector with omni-directional antennas, three sectors with approximately 120 degree antennas, six sectors with approximately 60 degree antennas, etc. Base station 104 may employ multiple antennas to serve each sector in order to provide various advanced communication modes (e.g., beamforming, multi-stream transmission or multiple input/multiple output (MIMO) (closed loop or open loop), spatial division multiple access (SDMA), cyclic shift diversity, or other spatial techniques).

Figure 2:
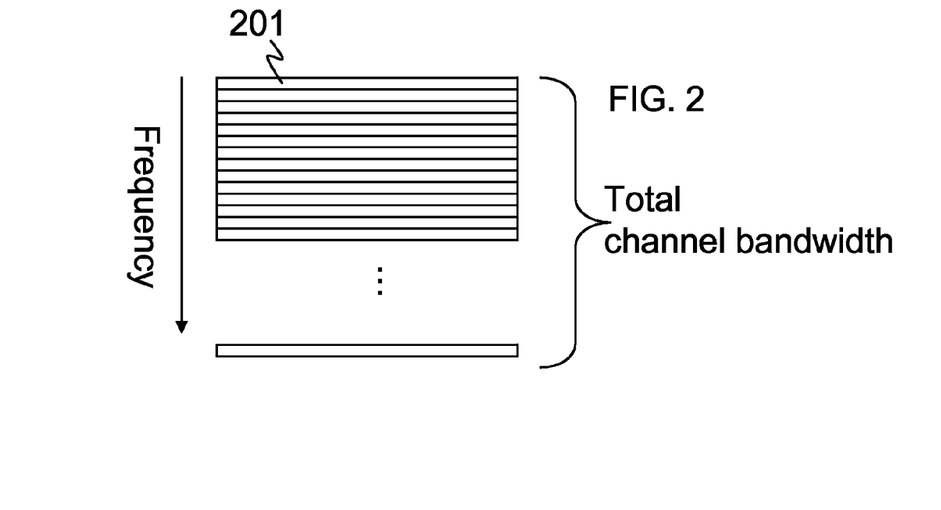
FIG. 2 illustrates a wideband channel divided into many narrow frequency bands.
Figure 3:
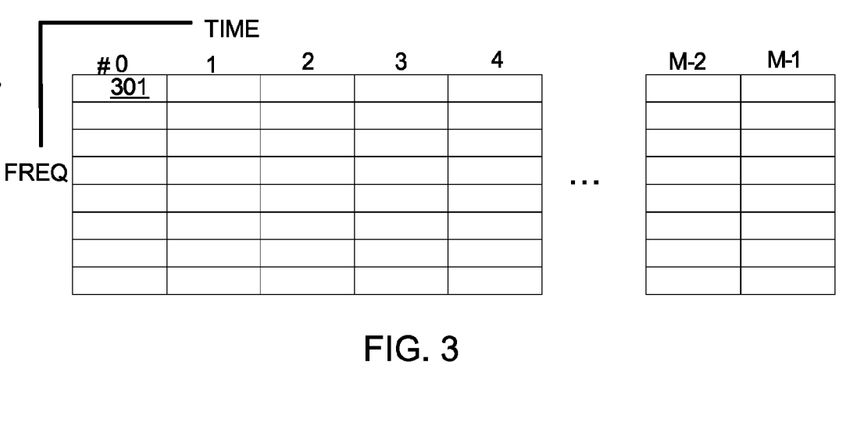
FIG. 3 illustrates the two-dimensional nature of OFDM resource allocation.

As one of ordinary skill in the art will recognize, during operation of an OFDM system, multiple subcarriers 201 (e.g., 768 subcarriers) are utilized to transmit data in a wideband channel. This is illustrated in FIG. 2. As shown in FIG. 2 the wideband channel is divided into many narrow frequency bands (subcarriers) 201, with data being transmitted in parallel on subcarriers 201. FIG. 3 shows the two-dimensional nature of OFDM signals and OFDM resource allocation, with each rectangle in the frequency dimension representing a subcarrier and each rectangle in the time dimension representing an OFDM symbol period. For example, element 301 represents a first subcarrier during a first OFDM symbol period. For an OFDM-based system, a particular subcarrier on a particular symbol period can be referred to as a time-frequency symbol position or a time-frequency resource (a symbol period in a single-carrier system may also be referred to as a time-frequency symbol position even though the frequency position is typically invariant over time in a single carrier system). In order to reduce the peak-to average power ratio of data transmissions from mobile units 101-103, the data may be pre-coded or spread by a DFT prior to mapping the data onto the OFDM subcarriers. Such pre-coding in an OFDM system is known in the art and may be referred to as DFT spread OFDM, or DFT-SOFDM.

A resource block may comprise a set of subcarriers, such as one or more subcarriers (e.g., 12 adjacent subcarriers), and may be used for a particular transmission for a number of OFDM symbol periods (e.g., 7 adjacent OFDM symbol periods). Also note that one or more of the time-frequency resources of transmission on a resource block may contain pilot symbols to support coherent demodulation of data on other time-frequency elements. When allocating resources to a user, it is convenient and efficient to allocate in terms of predefined resource blocks for predefined periods of time in order to reduce resource assignment signaling overhead.

As discussed above, a need exists for a method and apparatus for performing resource allocation with lower required overhead than previous methods. In order to address the above-mentioned need, the present invention develops a hybrid approach to obtaining channel quality information and to resource allocation, called frequency semi-selective (FSS) resource allocation, or FSS-RA. FSS-RA can be used either for the downlink or the uplink of a cellular system or access-point based system, or for other types of links between communication units, but it is especially well suited for the uplink, and it will be described in the uplink context for the sake of illustration.

For FSS-RA, resource allocations for data transmissions are chosen in such a way as to provide channel quality information for various parts of the channel bandwidth (frequency selective channel quality information), such as allocating two different resource blocks (on different sets of subcarriers) to a mobile unit for two different transmissions. These data transmissions are used to estimate frequency selective channel quality information, thereby eliminating or greatly reducing the need for channel sounding with a broadband pilot. As a result, the overhead on the uplink of the communication system may be significantly reduced.

As is evident, if the positions of the different resource blocks were chosen randomly each time, then frequency selective channel quality information would be obtained, but no FS allocation performance benefit would be obtained. In order to obtain a FS allocation benefit, at least one of the e.g. two resource allocations is made to a part of the channel bandwidth that is expected to have higher channel quality than other parts of the channel bandwidth, based on the frequency selective channel quality information that has been obtained from analyzing previous transmissions. The other resource allocation is made to another portion of the channel bandwidth (e.g., randomly selected, or based a fixed offset from the first allocation, or based on a scanning/hopping pattern, etc.) in order to provide current channel quality information for the other portion of the channel bandwidth. Over time, this process provides the base station with channel quality information for various portions of the channel bandwidth, and enables the base station to assign high-quality resources (similar to FS) for some (e.g., half) of the transmissions of the mobile unit, leading to a higher overall performance than frequency non-selective (FNS) allocation policies. Examples of FNS policies are scattered (or distributed) subcarrier allocation over the whole channel bandwidth, and random frequency hopping within the channel bandwidth.

Figure 4:
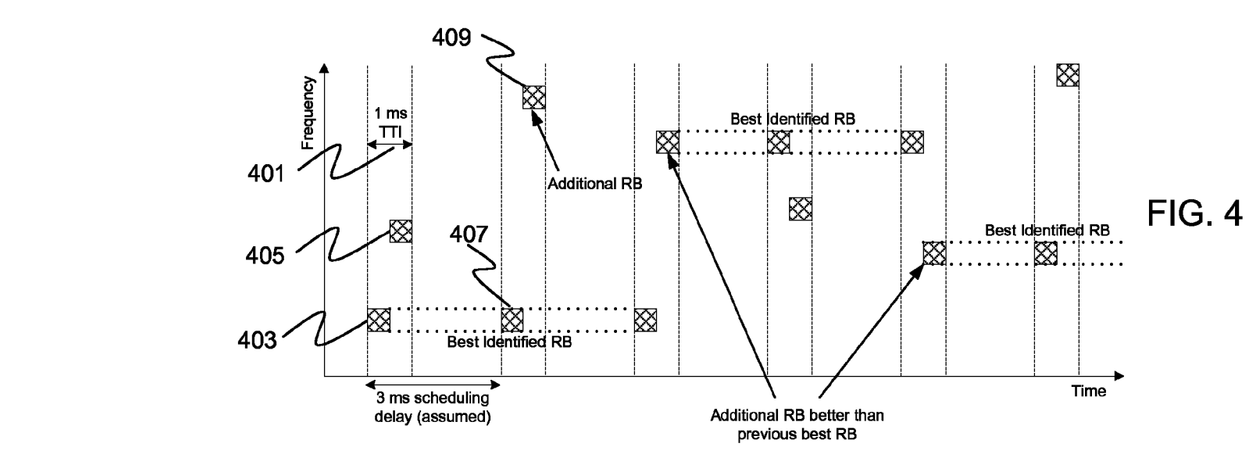
FIG. 4 illustrates an operational scenario of an embodiment of the present invention.

FIG. 4 shows an operational scenario of one embodiment of the present invention (FSS-RA) in the context of an uplink of a cellular communication system. In this example, the communication system 100 uses a 1 ms scheduling granularity or transmission time interval (TTI) 401, which comprises two time slots of 0.5 ms each, with each time slot comprising seven OFDM symbol periods (not shown). User equipment (UE) can transmit on each of the two time slots within one TTI. A UE transmits on the uplink using DFT-SOFDM in order to provide a low peak-to-average power ratio (PAPR). In order to preserve the low PAPR property of DFT-SOFDM, a transmission within one time slot should occupy only one or more adjacent RBs rather than arbitrarily spaced RBs, since transmitting two non-adjacent RBs in the same time interval can result in a higher PAPR. However, the RB used for transmission in the second time slot can be different than used in the first time slot (time multiplexing of two DFT-SOFDM transmissions within the TTI). Starting at the left side FIG. 4, the UE performs two transmissions 403 and 405 within a TTI. One transmission 403 is on a first portion of the communication channel bandwidth (e.g., an RB comprising a particular set of 12 subcarriers out of 300 subcarriers in a 5 MHz channel) in a first time slot (e.g. time slot k), and another transmission 405 is on a second portion of the communication channel bandwidth in a second time slot (e.g., time slot k+1). The transmissions include data, and may also include pilot information to support the coherent detection of the data at the base station. When the transmissions comprising data include pilot information or pilot symbols for supporting coherent detection, the pilot information is confined to substantially the same portion of the bandwidth as the data (i.e., the data transmissions do not comprise an out-of-band or wideband channel sounding pilot).

The transmissions may be made by the UE based on a previously received resource assignment from the base station. The base station receives the two transmissions 403 and 405 from the UE, and estimates a channel quality for each of the two portions of the channel bandwidth. The channel quality for a particular received transmission can be estimated in various ways, such as received signal strength, channel estimates based on pilot information within the transmission, channel estimates based on decision-directed channel estimation if no pilot information in present, SNR estimation, etc. The base station then prepares to make resource assignments to the UE for later transmissions of the UE. The base station uses the two RBs from the two received transmissions as candidate RBs for one of the next resource assignments to the UE. More specifically, the base station determines which of the two RBs (portions of the channel bandwidth) has a higher channel quality, and then assigns the RB having the higher channel quality (best identified RB) 407 to the UE for a subsequent transmission by the UE (3 ms later in this example). In addition, the base station assigns an additional RB 409 to the UE that is preferably different than the best identified RB. For example, the additional RB could be selected based on a pseudo-random pattern, predetermined offset from the best identified RB, etc. Note that the order of the transmission of RBs 407 and 409 within the TTI could also be reversed from what is shown, although the order shown is preferable to reduce the amount of channel variation between identifying and utilizing best RB. This process can be repeated over time for several resource assignment cycles, as shown in FIG. 4.

The purpose of assigning the additional RB 409 to the UE in an assignment cycle is to provide the ability to continuously identify and track the high-quality portions of the channel bandwidth as the channel conditions change over time. More specifically, the portion of the bandwidth having the highest quality will change over time, and the present invention enables the base station to identify and assign the current high quality bandwidth portion for some of the UE transmissions (thus providing the benefit of FS resource allocation), while additional UE transmissions are assigned so as to facilitate identifying changes in the position of the best RB over time.

An alternative way to identify the best RB, as known in the art, would be to have the UE transmit a wideband channel sounding pilot signal (e.g., wider than the bandwidth used for data transmission in a particular time slot) in some of the TTIs. However, such an approach would result in significant additional overhead, since the resources used for the wideband channel sounding signal cannot be used for data transmissions by other UEs in the system. In the present invention, novel assignment of the resource blocks used for data transmissions eliminates the need for conventional channel sounding overhead. The tradeoffs as compared to conventional channel sounding are that only a portion of the UE data transmissions (rather than all) can be on the best RB, and that conventional wideband channel sounding is able to track channel variations up to higher Doppler rates since it can sound the entire channel bandwidth at one time. Another tradeoff is that the present invention may provide a more reliable channel quality estimate than wideband channel sounding, since for the same transmit power from a UE, the per-subcarrier SNR of a wideband channel sounding signal would be lower than that of a narrower bandwidth RB transmission.

Figure 5:
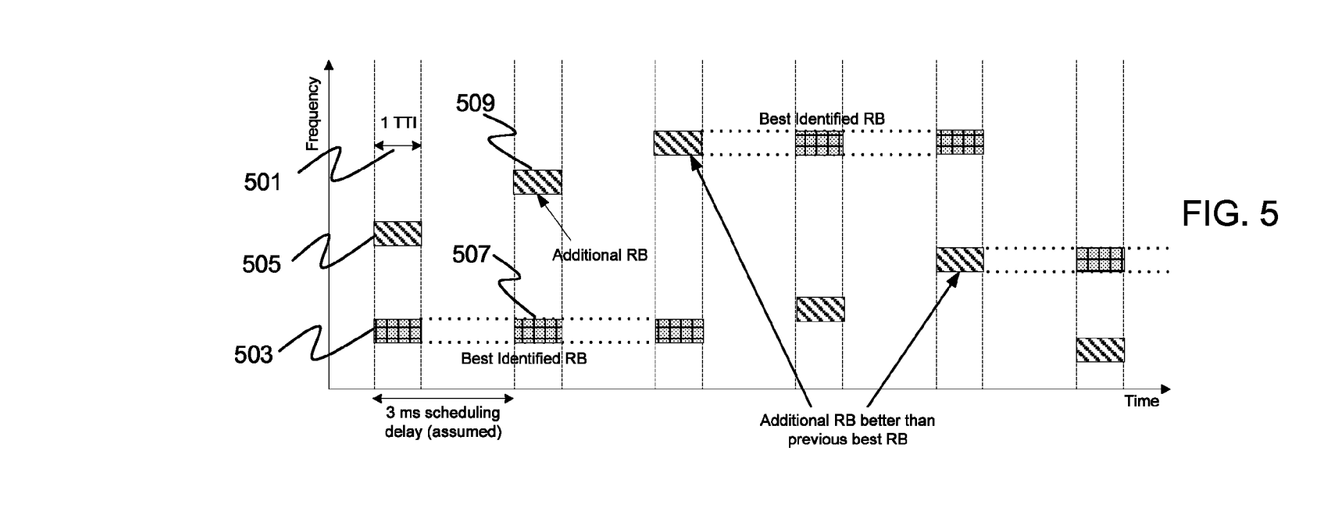
FIG. 5 illustrates an operational scenario of an embodiment of the present invention.

While FIG. 4 shows an example where transmissions from a UE occur at different times (time multiplexed), more generally some transmissions from a UE may overlap in time (frequency multiplexed). FIG. 5 shows an embodiment that is similar to that of FIG. 4, but differs from FIG. 4 in that the two transmissions 503 and 505 (or possibly more than two transmissions, not shown) in a TTI 501 can overlap in time. For a system that uses OFDM without DFT pre-coding, the PAPR is fairly large to begin with, such that allowing the two transmissions to be made simultaneously does not greatly impact PAPR.

Figure 6:
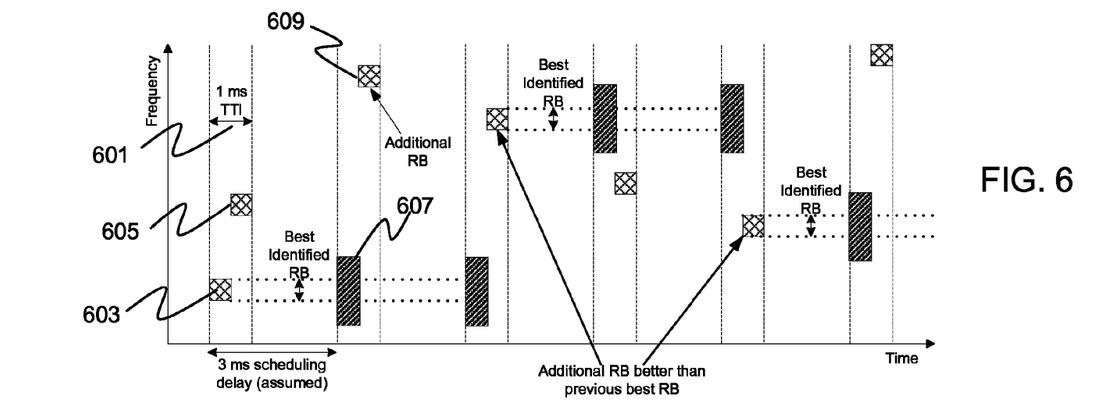
FIG. 6 illustrates an operational scenario of an embodiment of the present invention.

While FIG. 4 and FIG. 5 show examples where the bandwidth of each transmission is the same, more generally the bandwidth of different transmissions can differ and may be greater than a single RB, such as using different bandwidths within a TTI, different bandwidths among different TTIs, or both. An example scenario of different transmission bandwidths is illustrated in FIG. 6. Transmissions 603 and 605 have the same transmission bandwidth similar to the scenario of FIG. 4. The base station receives two transmissions 603 and 605 from the UE, and estimates the channel quality for each of the two portions of the channel bandwidth. The base station then prepares to make resource assignments to the UE for the next transmissions of the UE. However, the base station may decide to allocate a larger bandwidth for one of the assignments (e.g., the UE may need to transmit at a higher data rate). Consider the case where transmissions 603 and 605 are each 1 RB, but the base station will assign three adjacent RBs for one of the transmissions in a subsequent TTI. In this case, the base station will have two candidate sets of time-frequency resources to select from for the assignment—a three RB set of time-frequency resources near the RB of transmission 603, and a three RB set of time-frequency resources near the RB of transmissions 605. Since the channel quality can only be directly evaluated on the RBs of transmissions 603 and 605, the base station estimates the channel quality for one of the two candidate sets of time-frequency resources based on the channel quality information obtained from transmission 603, and estimates the channel quality for the other of the two candidate sets of time-frequency resources based on the channel quality information obtained from transmission 605.

The simplest method for estimating of the channel quality of the three adjacent RB candidate is to assume that the channel is correlated over the three RBs, and that as a result the channel quality information obtained from a nearby RB or an RB within the span of the three RBs can be used as the estimate of the channel quality for the candidate set. This type of estimate is expected to perform well as long as the channel remains reasonably correlated over the bandwidth spanned by a candidate set. Different types of estimation, such as extrapolation, prediction or others, could alternatively be used. Various estimation techniques can also be used in the time dimension as well (e.g., to estimate the quality of a set of time-frequency resources at a future point in time). Returning to FIG. 6, the base station has determined that the candidate set of time-frequency resources around the RB of transmission 603 has a higher estimated channel quality than the candidate set of time-frequency resources around the RB of transmission 605, so the base station assigns the candidate set 607 for subsequent transmission by the UE. In addition, the base station assigns an additional RB 609 (or possibly multiple RBs) to the UE, which serves the purpose of both additional data transmission and searching for portions of the channel bandwidth having a higher quality than the portion 607.

FIG. 6 illustrates exemplary operation with a single UE. In the case of multiple UEs, it may be desired to have a larger transmission, such as candidate set 607, and a smaller transmission, such as additional RB 609, for each UE. In this case, a first UE may have candidate set 607 on a first slot of a TTI, and a second UE may have candidate set 607 on a second slot of a TTI, in order to better pack transmissions within the available bandwidth. The slot on which the candidate set 607 and additional RB 609 are sent may be signaled, such as with 1 bit in an assignment or via higher layer signaling, or known based on a UE identification.

Figure 7:
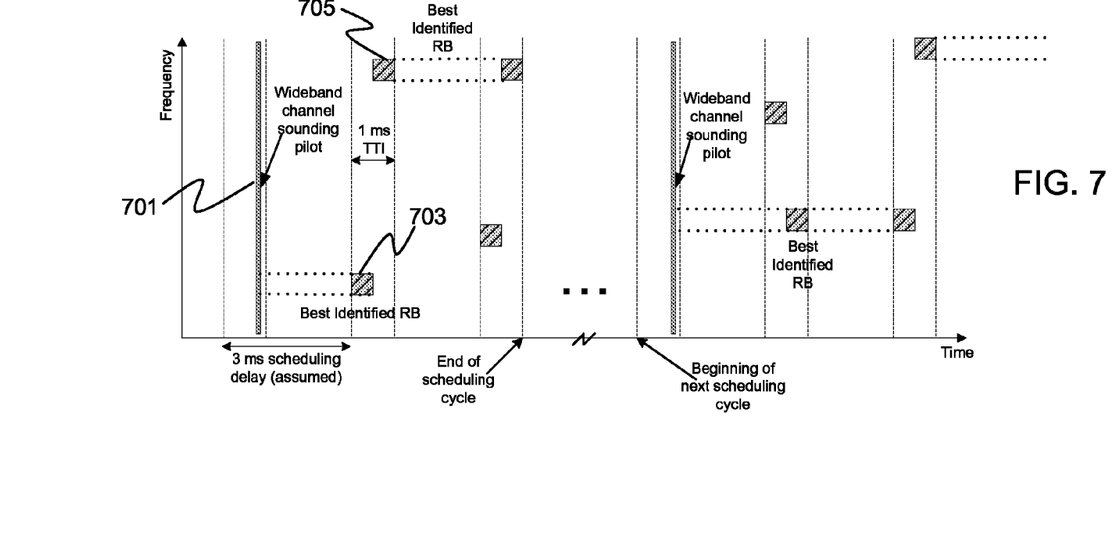
FIG. 7 illustrates an operational scenario of an embodiment of the present invention.

FIG. 7 illustrates a scenario where wideband channel sounding is incorporated into the present invention. The scenario is that a UE may be silent (no data to transmit) for a large period of time, and then may have a small amount of data to transmit, and then may become silent for another significant portion of time, and so forth. The time where the UE has some data to transmit will be referred to as a scheduling cycle for convenience. When a UE transitions from a period of silence to a scheduling cycle, there will not be any prior uplink channel quality information for the UE available at the base station. Moreover, if the UE only has a small amount of data to transmit, a scheduling cycle may only comprise a small number of transmissions, which means that the best identified RB might not converge to the actual highest quality portion of the channel bandwidth before the end of the scheduling cycle. In order to improve performance in this scenario, the UE may transmit a broadband channel sounding pilot 701 at the beginning of a scheduling cycle to enable the base station to determine an initial best RB or best portion of the channel bandwidth. As shown, the broadband sounding pilot 701 will have bandwidth greater than the smallest data assignment (1 RB), and may have bandwidth greater or equal to a planned data assignment. The base station may allocate the best RB to the UE for some number of transmissions thereafter (e.g., for as long as the channel quality is expected to remain nearly constant), and then transition to the FSS-RA mode. In the example of FIG. 7, the base station begins transitioning to the FSS-RA mode approximately 3 ms after it receives the wideband channel sounding pilot signal from the UE, as one assignment for the UE is on the best RB 703 as determined from the wideband channel sounding 701 and a second is on another RB in a different portion of the channel bandwidth.

Figure 8:
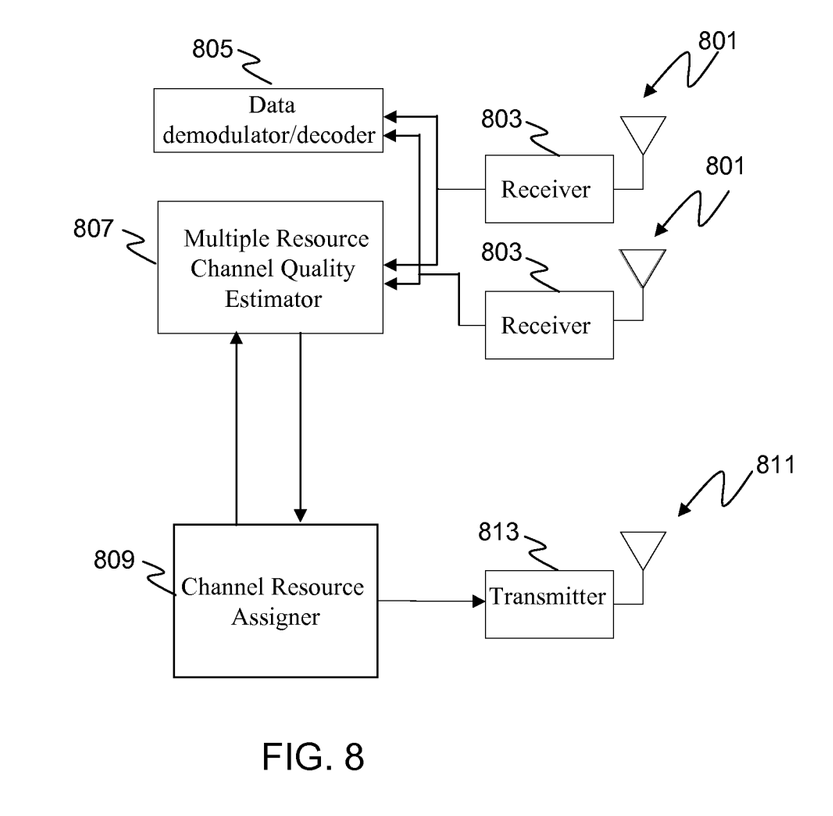
FIG. 8 is a block diagram of a base station in accordance with the present invention.

FIG. 8 shows one embodiment of wireless communication unit, such as a base station, in accordance with the present invention. The communication unit comprises one or more receive antenna paths 801 (two shown), each with an antenna and RF receiver 803. Receive paths receive signals from other communication units, such as UEs, down-convert and digitize the received signals and pass them to a data demodulator/decoder 805 and a multiple resource channel quality estimator 807. Demodulator/decoder 805 demodulates and decodes data included in the received signals, based on the modulation and coding format used by the particular UE's signal being demodulated at a particular time. With multiple receive antenna paths 801, demodulator/decoder 805 may perform diversity combining or other types of spatial processing of the received signals on different receive branches as part of the demodulation/decoding process. Multiple resource channel quality estimator 807 estimates channel quality for multiple sets of time-frequency resources (e.g., multiple RBs) based on the transmissions received from a UE and instructions from resource assigner 809. With multiple receive antenna paths 801, the channel quality estimates preferably include the effect of diversity combining on the channel quality of the each of the multiple sets of time-frequency resources. Channel resource assigner 809 instructs multiple resource channel quality estimator 807 as to which sets of time-frequency resources (candidate sets of time frequency resources) to provide channel quality estimates back to channel resource assigner 809. For example, in the scenario of FIG. 4, at a particular time there would be two candidate sets of time-frequency resources—one candidate set includes the same set of subcarriers as one of the UE transmissions in the most recent TTI used by the UE, and the second candidate set includes the same set of subcarriers as the other UE transmission in the most recent TTI used by the UE. Channel resource assigner 809 also determines which of the candidate sets of time-frequency resources has a higher estimated channel quality based on the estimates from multiple resource channel quality estimator 807, and assigns the candidate set of time-frequency resources having higher channel quality to the UE for subsequent data transmission by the UE. In case of a base station that is to provide assignments for multiple UEs, there may be collisions in that two or more UEs may have a higher channel quality estimate for the same or overlapping candidate set of resources. In this case, collisions may be resolved by assigning one UE its other candidate set, modifying the candidate sets such that they are non-overlapping, or deferring (in the case of asynchronous hybrid ARQ) one UE's transmission to a subsequent TTI. Channel resource assigner 809 also assigns an additional set of time-frequency resources to the UE for subsequent data transmission. The assignments are communicated to the UE by transmitting assignment information with transmitter 813 and transmit antenna 811. Note that more than one transmit antenna may be used (not shown), and that transmitter 813 and a receiver 803 may utilize the same antenna in some communication unit architectures.

Figure 9:
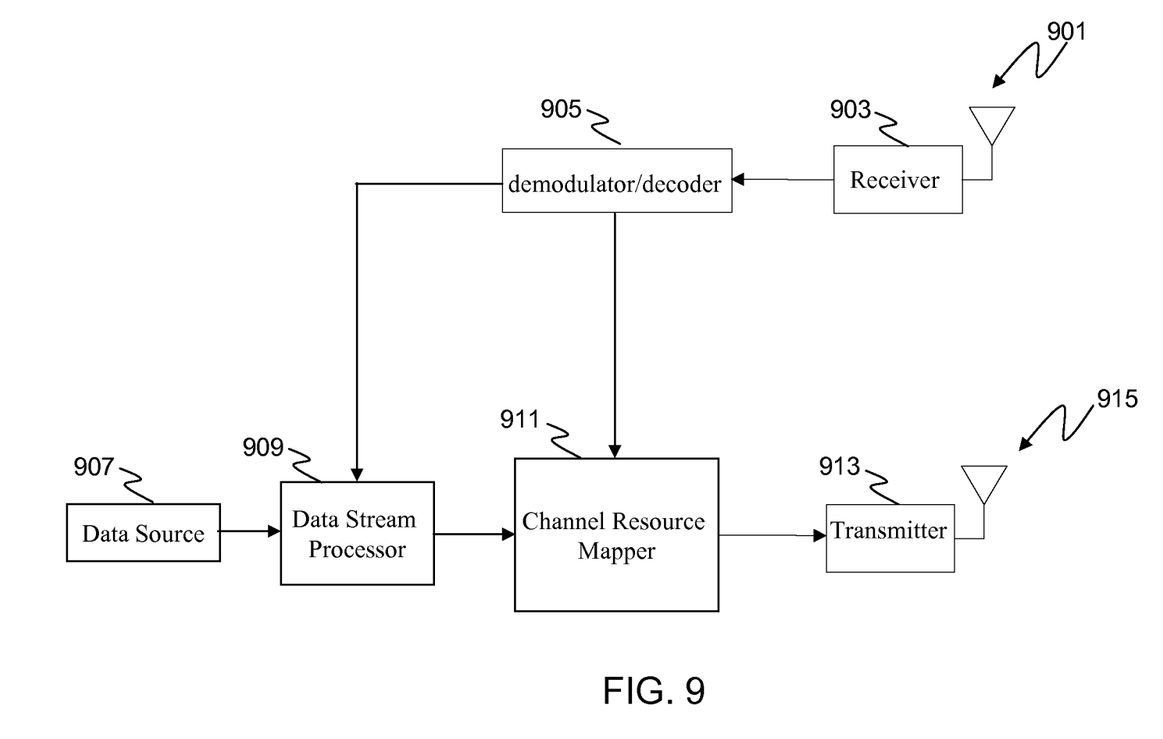
FIG. 9 is a block diagram of a remote unit in accordance with the present invention.

FIG. 9 shows one embodiment of another communication unit, such as a UE, in accordance with the present invention. Data source 907 provides the data to be transmitted. Data stream processor 909 prepares the data for transmission over the wireless channel. Data stream processor 909 forms codewords of data by applying some type of coding to the incoming data, such as turbo coding, convolutional coding, repetition coding, spreading (which can be considered a form of repetition coding), etc. The coded data is mapped to data symbols (such as QPSK, 16-QAM, etc.). The coding rate and modulation type may depend on a modulation and coding rate assigned by a base station, as received by the UE on antenna path 901 with receiver 903, demodulated and decoded by demodulator/decoder 905 and passed to the data stream processor 909 by demodulator/decoder 905. Data stream processor also performs DFT pre-coding of data symbols if the transmission format used by the UE is DFT-SOFDM. The processed data is provided to channel resource mapper 911. Data stream processor also provides pilot symbols to channel resource mapper 911, for the purpose of supporting coherent demodulation of the data stream transmitted by the UE. Channel resource mapper 911 maps inputs from data stream processor 909 to sets of time-frequency resource elements. For example, a first set of inputs from data stream processor 909 is mapped to a first set of time-frequency resources on a first portion of the channel bandwidth, and a second set of inputs from data stream processor is mapped to a second set of time-frequency resources on a second portion of the channel bandwidth. The specific sets of time-frequency resources used at a particular time are based on an assignment received from a base station, as provided by demodulator/decoder 905. The mapped data on sets of time-frequency resources is passed to transmitter 913, which performs OFDM modulation and transmits the modulated data from antenna 915.

Figure 10:
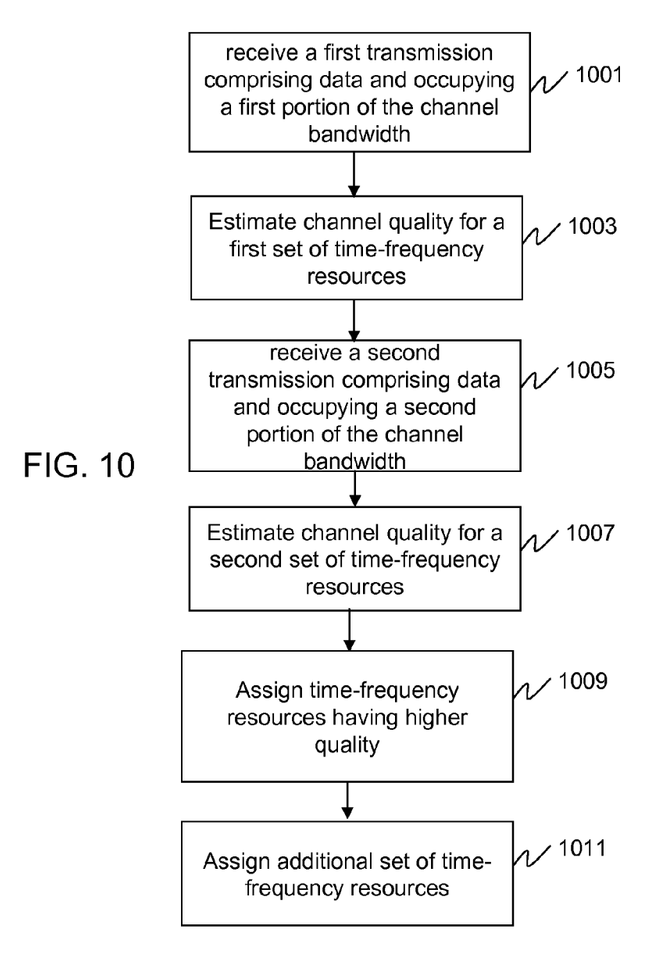
FIG. 10 is a flow chart showing operation of a base station in accordance with the present invention.

FIG. 10 shows a flow chart of one embodiment of the present invention. A first transmission is received from a communication unit at, for example, a base station (FIG. 8) on antenna paths 801 by receivers 803 (step 1001). The first transmission comprises data, and occupies only a first portion of the communication channel bandwidth. The first transmission is from communication unit (such as a UE, FIG. 9). The first portion may be one or more adjacent resource blocks, or a particular set of subcarriers. Although the transmission comprises data the transmission may also comprise a pilot signal (such as pilot symbols) for supporting coherent demodulation of the data.

A channel quality is estimated for a first candidate set of time-frequency resource elements by multiple resource channel quality estimator 807 of FIG. 8 (step 1003). This channel quality is based on the quality of the received data or pilot contained in the first transmission first transmission.

A second transmission is received by the communication unit (FIG. 8) on antenna paths 801 by receivers 803 (step 1005). The second transmission comprises data, and occupies only a second portion of the communication channel bandwidth. The second portion may be one or more adjacent resource blocks or a set of subcarriers that are preferably located in a different region or portion of the communication channel bandwidth than the first transmission. Although the second transmission comprises data the second transmission may also comprise a pilot signal (such as pilot symbols) for supporting coherent demodulation of the data. When the first or second transmissions comprising data include pilot information or pilot symbols for supporting coherent detection, the pilot information is confined to substantially the same portion of the bandwidth as the data (i.e., the data transmissions do not comprise an out of band or wideband channel sounding pilot). A channel quality is estimated for a second candidate set of time-frequency resource elements by multiple resource channel quality estimator 807 of FIG. 8 (step 1007). The quality for the second candidate set of time-frequency resource elements is based on the quality of the received data or pilot contained in the first transmission second transmission.

The first candidate set of time-frequency resources preferably comprises frequency resources that have a channel quality that is expected to be correlated with the channel quality of the first portion of the bandwidth. For example, the first candidate set of time-frequency resources could comprise the same frequency resources as the first transmission (as illustrated in FIG. 4), partially overlapping frequency resources (as illustrated in FIG. 6), or non-overlapping frequency resources that are expected to have correlated channel quality (e.g., based on the channel coherence bandwidth, delay spread, or a cyclic prefix length used in the system).

The second candidate set of time-frequency resources preferably comprises frequency resources that have a channel quality that is expected to be correlated with the channel quality of the second portion of the bandwidth. For example, the second candidate set of time-frequency resources could comprise the same frequency resources as the second transmission (as illustrated in FIG. 4), partially overlapping frequency resources (as illustrated in FIG. 6), or non-overlapping frequency resources that are expected to have correlated channel quality (e.g., based on the channel coherence bandwidth, delay spread, or a cyclic prefix length used in the system).

Returning to FIG. 10, the one of the first and second sets of candidate time-frequency resources having a higher estimated channel quality is assigned to the UE for later (subsequent) data transmission by the UE (step 1009). Since the first and the second set of candidate time-frequency resources exist within differing portions of the communication channel bandwidth, a frequency selective resource allocation benefit to the UE is provided. The assignment is determined by channel resource assigner 809 of FIG. 8 and communicated to the UE by transmitter 813 and antenna 811. In addition, another additional set of time-frequency resources is assigned (step 1011) by channel resource assigner 809 to UE for later (subsequent) transmission by the UE. It is preferred that the additional set of time-frequency resources comprises a different set of subcarriers than the candidate set having the higher channel quality. In other words, the assigned additional set of time-frequency resources is preferably not equal to the one of the first and the second set of candidate time-frequency resources having the higher estimated channel quality. Having different subcarriers in the additional set will provide the base station with channel quality information for another portion of the channel bandwidth (when the UE transmits on the additional set of time-frequency resources), to help the base station identify changes in channel quality over the channel bandwidth.

Note that the particular order of steps used in FIG. 10 does not imply a same required time order of steps of the present invention. For example, the first transmission may be received either before or after or simultaneously with the second transmission, the estimation of a channel quality for the first set of candidate time-frequency resources may occur either before or after or simultaneously with receiving the second transmission, the assigning an additional set of time-frequency resources may occur before or after or simultaneously with assigning the one of the first and second candidate sets having higher estimated channel quality, etc.

In the logic flow of FIG. 10, the first and second transmissions are preferably received close together in time, such that channel quality does not change drastically between the times they are received. For example, in a system using DFT-SOFDM with time multiplexing of transmissions from a particular UE, the first transmission could be received in a time slot k, and the second transmission could be received in time slot k+1, or the first transmission could be received in a time slot k and the second transmission in time slot k−1, or more generally the first transmission on time slot k and the second on time slot k+/−m, where m is an integer that is preferably small enough that the channel quality remains correlated over m time slots. For the case of OFDM transmission by the UE, the first and second transmissions can also occur on time slots k and k+/−m, but OFDM is better suited to the case of m=0 (simultaneous transmission, as illustrated in FIG. 5) than DFT-SOFDM, due to the PAPR properties described earlier. Hence, with OFDM, the first and second transmissions are preferably overlapping in time but not overlapping in frequency (on different portions of the channel bandwidth). Within a time slot, a transmission may comprise multiple symbol periods in time and multiple subcarriers in frequency.

Note that the method of FIG. 10 can be repeated at different points in time in order to provide a series of resource assignments to a UE over time. In this case, the first transmission may be based on a previous assignment made to the UE by the method of FIG. 10. More specifically, the first transmission may correspond to either a previously assigned set of candidate time-frequency resources having a higher quality (step 1009 at an earlier point in time) or a previously assigned additional set of time-frequency resources (step 1011 at an earlier point in time).

Figure 11:
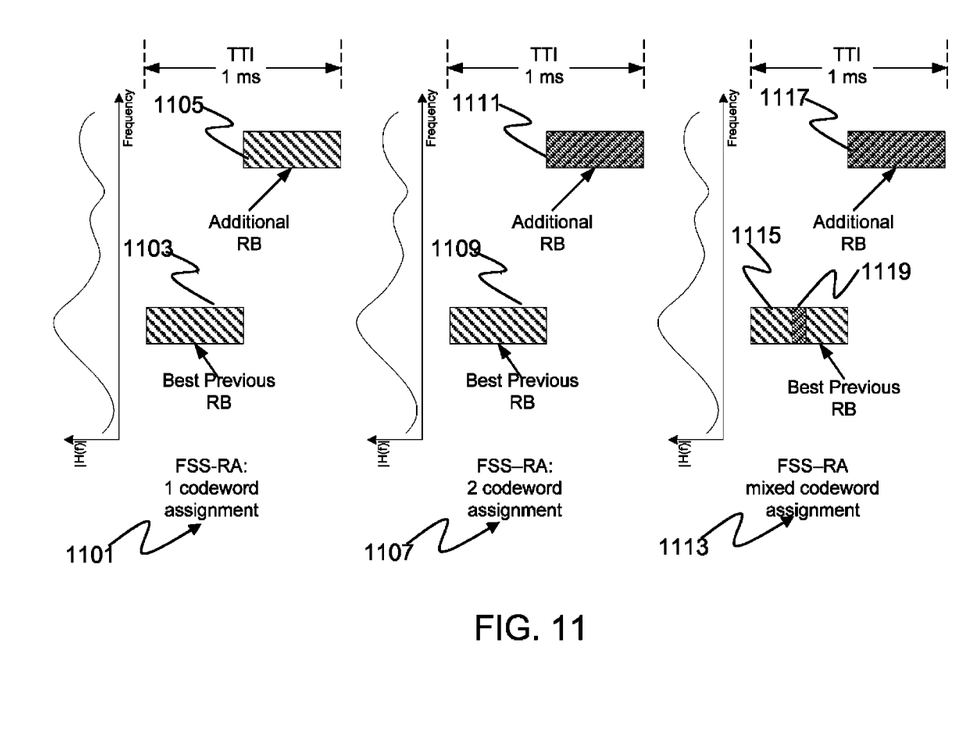
FIG. 11 illustrates codeword assignments in accordance with the present invention.

FIG. 11 illustrates an additional aspect of the invention relating to how the assigned sets of resources of FIG. 10 can be used by the UE for transmitting data codewords (codewords were described earlier in conjunction with FIG. 9). The frequency axis of FIG. 11 includes an example representation of the current relative communication channel quality (e.g., the magnitude of the complex channel gain) over frequency. Reference numeral 1101 shows the case of a single codeword assignment, where a codeword is divided into two portions. In this case, the assigned one of the first and second candidate sets of time-frequency resources is for a first portion of a codeword (1103), and the additional assigned set of time-frequency resources is for a second portion of the codeword (1105). Reference numeral 1107 shows the case of a multiple codeword assignment, where the assigned one of the first and second candidate sets of time-frequency resources is for a first codeword (1109), and the additional assigned set of time-frequency resources is for a second codeword (1111). Reference numeral 1113 shows the case of a mixed codeword assignment, where the assigned one of the first and second candidate sets of time-frequency resources is for a first codeword (1115) and only a portion (1119) of a second codeword, and wherein the additional set of time-frequency resources is for a remaining portion (1117) of the second codeword.

A benefit of mixed codeword assignment is that the second codeword is able to partially benefit from the higher channel quality experienced by the first codeword, thus improving the probability that the second codeword will be correctly detected. The type of codeword assignment may be predetermined based on system design parameters, or may be selected by the base station channel resource assigner 809 FIG. 8 and conveyed explicitly or implicitly as part of the resource assignment. In the UE, the data stream processor 909 of FIG. 9 will prepare the necessary number of codewords for transmission and the channel resource mapper will map the one or more codewords to the assigned sets of time frequency resources in accordance with the type of codeword assignment being used. Note that the for the mixed codeword case, different MCSs may be used on the different codewords, and the relative sizes and mixing patterns may be different than is illustrated in FIG. 11.

In the logic flow of FIG. 10 the assignments of the sets of time-frequency resource elements may be conveyed in a single message. In this case, the base station prepares a channel resource assignment message with channel resource assigner 809 of FIG. 8 and transmits the message to the UE with transmitter 813 and antenna 811. Embodiments of some aspects of the channel resource assignment message are described next.

As described earlier, the communication channel bandwidth may be divided into resource blocks (RBs) or sets of time-frequency resources, each comprising a different set of subcarriers. These RBs may be labeled with indices for the purpose of identifying each RB in the resource assignment process. Consider an example system with 300 total assignable subcarriers and an RB size of 12 adjacent subcarriers. For this system, there will be a total of 300/12=25 RBs. The RBs can be indexed in various ways, such labeling the RB starting at the lowest portion of the communication channel bandwidth (i.e., the 12 lowest frequency subcarriers) as the RB of index p=0, the RB having the next 12 higher subcarrier frequencies (adjacent to the index p=0 RB) as RB of index p=1, etc. up to RB index p=24.

In one embodiment, the resource assignment message includes a first RB index (or time-frequency resource index) for assigning the one of the first and second set of candidate time-frequency resources having a higher estimated channel quality and a second RB index (or time-frequency resource index) for assigning the additional set of time-frequency resources. Transmitting a first and a second RB index may not consume additional bandwidth in the case where an uplink grant may contain reserved bits in order to match the size of a larger downlink grant. In that case, transmitting FSS information such as indices may be in place of reserved bits.

In another embodiment, the resource assignment message includes a candidate set indicator for assigning the one of the first and second set of candidate time-frequency resources having a higher estimated channel quality (rather than including an RB or time-frequency resource index for the same). The candidate set indicator can be as small as one bit. For example, a when a one bit candidate set indicator is set to zero, it may indicate that the same RB or set of time-frequency resources as was used for the first transmission (in the method of FIG. 10) is being assigned, while a bit value of one may indicate that the that the same RB or set of time-frequency resources as was used for the second transmission (in the method of FIG. 10) is being assigned. For OFDM transmission, the first transmission may correspond to a lower RB index, and the second transmission may correspond to a higher RB index. The number of bits of the candidate set indicator may be made larger than one in order to support different bandwidth resource assignments over time. For example, the first bit may have the same meaning as described for the one bit case, but the additional bits may indicate a bandwidth of the assignment (such as the number of RBs) and a starting RB index offset that offsets the starting RB index as compared to the value implied by the first bit. In addition, the assignment message may include an RB or time-frequency resource index for assigning the additional set of time-frequency resources. The total number of bits may be only 1 bit (or a small number) greater than that required for a FS assignment.

In another embodiment, the need to include an index for the additional set of time-frequency resources is eliminated by basing the assignment of the additional set on a predetermined scheme. This results in an automatic assignment of additional set of time-frequency resources. For example, the automatic assignment may be determined based on a predefined hopping pattern, or a predetermined frequency offset from the one of the first and second set of candidate time-frequency resources having a higher estimated channel quality. The hopping pattern may be independent of the first index (such as an absolute hopping pattern), or could be a relative hopping pattern (where a current hop value represents an offset from the first index).

In another embodiment, the resource assignment message is designed to be able to efficiently support both conventional FS resource allocation and the FSS-RA of the present invention, and to be able to easily switch between these modes of assignment over time. In this embodiment, the resource assignment message includes a mode indicator of whether the assignment mode is FSS or FS. The indicator can be as small as one bit. When the indicator indicates a FS assignment mode, then the RB or RBs assigned in the message will be constant for the duration of the assignment (e.g., for the two slots within a TTI). The RB assignment may be based on an RB index included in the assignment message. The resource assignment message may also include a candidate set indicator (as described earlier), which may be ignored (or used for another purpose, such as to indicate a frequency non-selective or frequency hopping mode) in the FS assignment mode, but is utilized in the FSS assignment mode. When the indicator indicates a FSS assignment mode, the candidate set indicator determines the RB or RBs of a first assignment and the RB index indicates the RB for a second assignment. Note that if a UE does not correctly receive a resource assignment message, the context of the candidate set indicator can be lost or erroneously interpreted. However, the base station may be able to determine when the assignment message has not been correctly received because the base station will not receive a transmission from the UE in such a case (or the base station may attempt to decode an expected transmission from the UE based on the assignment and the decoding will fail). Alternatively, the UE may have received the assignment message correctly, but the base station fails to properly decode the received transmission from the UE and determines that it was likely that no transmission attempt was made, such as by energy detection. In either case, the base station may not know whether the UE correctly received the assignment message. The base station can correct or recover from this situation as follows: first, the base station makes a resource assignment to the UE in the FS mode, since the RB index is specifically included and there will be no need to attempt to interpret the possibly ambiguous (in this situation) candidate set indicator. Then, if the base station receives and correctly decodes the transmission on the just assigned resources, the base station knows that the next resource assignment can be made using the FSS mode, since the UE knows which sets of resources were used for transmitting on the first and second time slots (first and second transmissions) corresponding to the previous resource assignment.

In each of the embodiments described, the resource assignment message may include additional information, such as a modulation/coding scheme (MCS) indicator, an indicator for the number of RBs being allocated, etc. The time that a resource assignment is to be used for transmission may be indicated in the assignment message, or alternatively it may be implicitly tied to the time that the resource assignment message was transmitted, based on a predetermined rule (e.g., assignment message transmitted in one TTI implies resources are being assigned for use two TTIs in the future).

Table 1 shows some examples of portions of the information that may be included in a resource assignment message for the various codeword modes shown in FIG. 11.

TABLE 1

Signaling examples based on FSS scheduling mode.

| FSS-RA mode | Signaling examples | |
| --- | --- | --- |
| | Automatic $2^{nd}$ allocation | Explicit $2^{nd}$ allocation |
| FSS-1 codeword | Candidate set bit or explicit first RB index + MCS index | Candidate set bit or explicit first RB index + second RB index + MCS index |
| FSS-2 codeword | Candidate set bit or explicit first RB index + MCS1 index + MCS2 index | Candidate set bit or explicit first RB index + second RB index + MCS1 index + MCS2 index |
| FSS-mixed codeword | Candidate set bit or explicit first RB index + MCS1 index + MCS2 index | Candidate set bit or explicit first RB index + second RB index + MCS1 index + MCS2 index |

Figure 12:
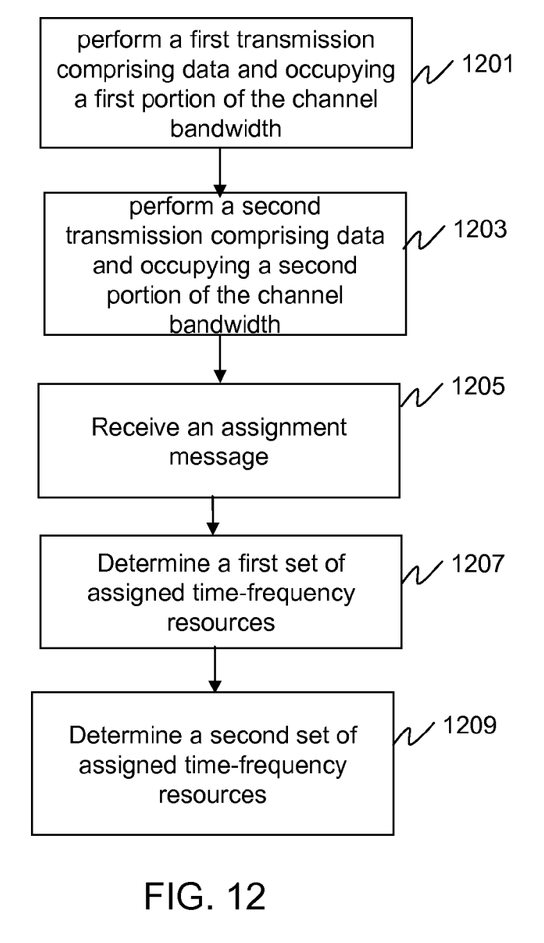
FIG. 12 is a flow chart showing operation of a remote unit in accordance with the present invention.

FIG. 12 is a flowchart of one embodiment of the invention for obtaining a resource assignment at a communication unit, such as a UE of FIG. 9. A first transmission is performed by transmitter 911 of FIG. 9 (step 1201), wherein the first transmission comprises data, and wherein the first transmission occupies only a first portion of the communication channel bandwidth. The first portion may, for example, be one or more adjacent resource blocks, or a particular set of subcarriers. The transmission may also comprise a pilot signal (such as pilot symbols) for supporting coherent demodulation of the data. A second transmission is performed by transmitter 911 of FIG. 9 (step 1203), wherein the second transmission comprises data, and wherein the second transmission occupies a second portion of the communication channel bandwidth. For example, the second portion may be one or more adjacent resource blocks or a set of subcarriers that are preferably located in a different region or portion of the communication channel bandwidth than the first transmission. The second transmission may also comprise a pilot signal (such as pilot symbols) for supporting coherent demodulation of the data. When the first or second transmissions comprising data include pilot information or pilot symbols for supporting coherent detection, the pilot information is confined to substantially the same portion of the bandwidth as the data (i.e., the data transmissions do not comprise an out of band or wideband channel sounding pilot).

An assignment message is received by receivers 903 of FIG. 9 (step 1205) and demodulated/decoded by demodulator/decoder 905. The message assigns a first set of time-frequency resources for subsequent transmission by the communication unit by including a candidate set indicator. The candidate set indicator is provided by demodulator/decoder 905 to channel resource mapper 911. The candidate set indicator indicates which of a first or second candidate set of time-frequency resources is assigned to the communication unit. For example, the candidate set indicator could be as little as one bit, where a bit value of zero indicates that the first set of candidate time-frequency elements is being assigned and a bit value of one indicates that the second set of candidate time-frequency elements is being assigned (or vice versa if the bit value mapping is reversed from this example). The communication unit determines the assigned candidate set of time-frequency resources (the first set of assigned time-frequency resources) in channel resource mapper 911 (step 1207) based on at least the candidate set indicator and at least one of the first portion or the second portion of the communication channel bandwidth. When the candidate set indicator indicates that the first candidate set of time-frequency resource elements is being assigned, the channel resource mapper 911 knows that the assigned set of time-frequency resources is on the same set of subcarriers (portion of the communication channel bandwidth) as the first transmission. However, when the candidate set indicator indicates that the second candidate set of time-frequency resource elements is being assigned, the channel resource mapper 911 knows that the assigned set of time-frequency resources is on the same set of subcarriers (portion of the communication channel bandwidth) as the second transmission. As described, there is a direct relationship between a candidate set of time-frequency resources and the time-frequency resources used for the first or the second transmission. However, note that the candidate set indicator could be larger than one bit, and the additional bits may be used to signify a modification of the described direct relationship. For example, the additional bits may specify an additional frequency offset (e.g., a number of subcarriers, a number of RBs), a change in transmission bandwidth (e.g., a number of additional RBs or a reduction in the number of RBs), a transmission bandwidth value (e.g., a number of RBs), etc. These additional bits can also be considered to be another part of the assignment message.

The message also assigns a second set of time-frequency resources to the communication unit for subsequent transmission by the communication unit. The first set of time-frequency resources occupies one of the first portion and the second portion of the communication channel bandwidth, and wherein the second set of time-frequency resources occupies a portion of the bandwidth other than the first and the second portion of the communication channel bandwidth.

Based on the message, at step 1209 the communication unit determines the second set of time-frequency resource elements with channel resource mapper 911 of FIG. 9. As described earlier, the second (additional) set of time-frequency resources can be determined in various ways (e.g., explicitly based on an index, automatically based on a predetermined scheme, etc.) depending on the system design and parameters. The communication unit of FIG. 9 also obtains data from data source 907, prepares the data for transmission with data stream processor 909, maps the output of the data stream processor 909 to the corresponding assigned set of time-frequency resources with channel resource mapper 911, and transmits on the corresponding assigned set of time-frequency resources with transmitter 913. These functions were described earlier in conjunction with FIG. 9

As described earlier in conjunction with FIG. 10, the order of the steps of the flow chart of FIG. 12 does not necessarily imply the same order of steps must be used by the invention.

While the invention has been particularly shown and described with reference to particular embodiments, it will be understood by those skilled in the art that various changes in form and details may be made therein without departing from the spirit and scope of the invention. It is intended that such changes come within the scope of the following claims.

The invention claimed is:

1. A method for a communication unit to obtain a resource assignment from a base station, the method comprising the steps of:
    the communication unit transmitting data in a first resource block over a first set of time-frequency resources;
    the communication unit transmitting data in a second resource block over a second set of time-frequency resources;
    the communication unit receiving a message from the base station assigning a third and a fourth resource block for subsequent transmission, wherein the third resource block replaces the first resource block and uses the first set of time-frequency resources, and wherein the fourth resource block replaces the second resource block and does not use either the first or second set of time-frequency resources; and
    the communication unit repeating the transmitting and receiving steps.

2. The method of claim 1 further comprising the steps of:
    wherein the first and second transmission further comprise a pilot;
    applying, by the communication unit, a DFT-precoding, by the communication unit, to the data prior to mapping the data to the first and second resource block;
    performing the first and second transmission comprising DFT-precoded data and non DFT-precoded pilot occupying the first and the second resource block.

3. The method of claim 1 wherein the fourth resource block is automatically determined from a hopping pattern or a frequency offset from the third resource block.

4. A method for a communication unit to obtain a resource assignment from a base station, the method comprising the steps of:
- receiving, by the communication unit, a first message from the base station assigning a first and a second resource block;
- performing, by the communication unit, a first transmission, wherein the first transmission comprises data, and wherein the first transmission occupies the first resource block comprising multiple channels over only a first portion of a communication channel bandwidth, wherein a channel comprises a time-frequency resource;
- performing, by the communication unit, a second transmission, wherein the second transmission comprises data, and wherein the second transmission occupies the second resource block comprising multiple channels over only a second portion of the communication channel bandwidth;
- receiving, by the communication unit, a second message from the base station assigning a third and a fourth resource block for subsequent transmission by the communication unit, wherein the third resource block comprises multiple channels on one of the first portion and the second portion of the communication channel bandwidth, and wherein the fourth resource block comprises multiple channels on a portion of the communication channel bandwidth other than the first and the second portion of the communication channel bandwidth;
- determining, by the communication unit, an assigned candidate set of time-frequency resources based on the second message;
- based on the determining step, replacing one of the first and second resource blocks with the third resource block, and replacing the other of the first and second resource blocks with the fourth resource block;
- repeating the receiving, performing and determining steps.

5. The method of claim 4 further comprising the steps of:
- wherein the first and second transmission further comprise a pilot;
- applying a DFT-precoding, by the communication unit, to the data prior to mapping the data to the first and second resource block;
- performing the first and second transmission comprising DFT-precoded data and non DFT-precoded pilot occupying the first and the second resource block.

6. A method in a base station for assigning resources within a communication channel bandwidth to a communication unit for transmission by the communication unit, the method comprising the steps of:
- receiving, by the base station, a first transmission from the communication unit, wherein the first transmission comprises data, and wherein the first transmission occupies a first resource block comprising multiple adjacent channels received over a first portion of the communication channel bandwidth, wherein a channel comprises a time-frequency resource;
- estimating, by the base station, a channel quality for the first resource block based on the received first transmission;
- receiving, by the base station, a second transmission from the communication unit, wherein the second transmission comprises data, and wherein the second transmission occupies a second resource block comprising multiple adjacent channels received over a second portion of the communication channel bandwidth;
- estimating, by the base station, a channel quality for the second resource block based on the received second transmission;
- assigning by the base station, to the communication unit, one of the first and the second resource block having a higher estimated channel quality; and
- assigning by the base station, to the communication unit, an additional resource block, the additional resource block replacing the one of the first and second resource blocks that was not assigned, to the communication unit for at least data transmission by the communication unit;
- wherein the first transmission further comprises a pilot, and wherein the step of estimating the channel quality for the first resource block is based on at least one of the data or pilot contained in the first transmission; and
- repeating the receiving, estimating and assigning steps.

7. The method of claim 6 wherein the assigned additional resource block is not equal to the one of the first and the second resource block having the higher estimated channel quality.

8. The method of claim 6 wherein the first and the second resource blocks exist within differing portions of the communication channel bandwidth.

9. The method of claim 1 wherein the first transmission is received in time slot (k), and the second transmission is received in a time slot (k+/−1).

10. The method of claim 6 wherein the first and second transmissions are overlapping in time, but non-overlapping in frequency.

11. The method of claim 6 wherein the assigned one of the first and second set of candidate time-frequency resources is for a first codeword.

12. The method of claim 6 wherein one of the first and the second resource blocks having a higher estimated channel quality is for a first codeword and only a portion of a second codeword, and wherein the additional resource block is for a remaining portion of the second codeword.

13. The method of claim 6 wherein the step of assigning one of the first and the second resource blocks and the additional resource block comprises the step of assigning the resources within a single message wherein the single message is an uplink grant message and a size of the uplink grant message in number of bits is equal to a size of a downlink grant message, wherein the downlink grant message assigns downlink resource blocks to the communication unit for reception of data from the base station.

14. The method of claim 13 wherein the single message comprises a first index for the one of the first and second resource blocks having a higher estimated channel quality and a second index for the additional resource block.

15. The method of claim 13 wherein the single message comprises a candidate set indicator indicating which of the first or second resource blocks is assigned to the communication unit.

16. The method of claim 15 wherein the single message further comprises an index for the additional resource block.

17. The method of claim 13 wherein the one of the first and second resource blocks having a higher estimated channel quality and the additional resource block are a same size resource.

18. The method of claim 6 wherein the additional resource block is automatically determined from a hopping pattern or a frequency offset from the one of the first and second resource block having a higher estimated channel quality.

19. An apparatus in a base station comprising:
- a receiver in the base station receiving a first transmission from a communication unit, wherein the first transmission comprises data and a pilot, and wherein the first transmission occupies only a first portion of a communication channel bandwidth, the receiver additionally receiving a second transmission from the communication unit, wherein the second transmission comprises data, and wherein the second transmission occupies only a second portion of the communication channel bandwidth, wherein a channel comprises a time-frequency resource and;

a channel quality estimator in the base station estimating a channel quality for a first set of candidate time-frequency resources based on at least one of the data and pilot of the received first transmission and for estimating a channel quality for a second set of candidate time-frequency resources based on the received second transmission;

a channel resource assigner in the base station assigning to the communication unit, one of the first and the second set of candidate time-frequency resources having a higher estimated channel quality and additionally assigning, to the communication unit, an additional set of time-frequency resources to the communication unit for at least data transmission by the communication unit, the additional set of time-frequency resources replacing the one of the first and second set of the of candidate time-frequency resources that was not assigned;

wherein the channel quality estimator and the channel resource assigner repeat their respective estimating and assigning functions after the unassigned one of the first and second set of candidate time-frequency resources is replaced.

20. A method for assigning resources to a communication unit, the method comprising the steps of:

receiving a first transmission that uses only a first set of candidate time-frequency resources;

estimating a channel quality for the first set of candidate time-frequency resources based on the received first transmission;

receiving a second transmission that uses only a second set of candidate time-frequency resources;

estimating a channel quality for the second set of candidate time-frequency resources based on the received second transmission;

assigning to the communication unit, the one of the first and the second set of candidate time-frequency resources having a higher estimated channel quality; and assigning to the communication unit, an additional set of time-frequency resources to the communication unit for at least data transmission by the communication unit, the additional set of time-frequency resources replacing the one of the first and second set of candidate resources not having the higher estimated channel quality;

repeating the receiving, estimating and assigning steps;

wherein the first transmission spans multiple symbol periods in time and multiple subcarriers in frequency, and is based on a previous assignment to the communication unit;

wherein the step of assigning one of the first and the second set of candidate time-frequency resources having a higher estimated channel quality and the additional set of time-frequency resources comprises the step of assigning within a single message.

* * * * *